United States Patent
Jones et al.

(10) Patent No.: US 9,623,952 B1
(45) Date of Patent: Apr. 18, 2017

(54) EXTERNAL ACOUSTIC LINERS FOR MULTI-FUNCTIONAL AIRCRAFT NOISE REDUCTION

(75) Inventors: Michael G. Jones, Newport News, VA (US); Russell H. Thomas, Yorktown, VA (US); Douglas M. Nark, Norfolk, VA (US); Brian M. Howerton, Newport News, VA (US); Michael J. Czech, Issaquah, WA (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 1041 days.

(21) Appl. No.: 13/417,351

(22) Filed: Mar. 12, 2012

Related U.S. Application Data

(60) Provisional application No. 61/451,735, filed on Mar. 11, 2011, provisional application No. 61/451,727, filed on Mar. 11, 2011, provisional application No. 61/451,730, filed on Mar. 11, 2011, provisional application No. 61/597,282, filed on Feb. 10, 2012.

(51) Int. Cl.
*B64C 1/40* (2006.01)
*B64C 25/00* (2006.01)

(52) U.S. Cl.
CPC ......... *B64C 1/40* (2013.01); *B64C 2025/003* (2013.01); *B64C 2220/00* (2013.01); *B64C 2230/14* (2013.01)

(58) Field of Classification Search
CPC ...... F02K 1/827; F02C 7/045; B64C 2220/00; B64C 2230/14; B64C 1/40; Y02T 50/166; Y02T 50/168
See application file for complete search history.

(56) References Cited

U.S. PATENT DOCUMENTS

| | | |
|---|---|---|
| 3,612,446 A | 10/1971 | Lebert |
| 3,779,338 A | 12/1973 | Hayden et al. |
| 3,821,999 A | 7/1974 | Guess et al. |
| 3,853,428 A | 12/1974 | Hayden et al. |
| 4,141,433 A * | 2/1979 | Warnaka ...................... 181/286 |
| 4,240,250 A | 12/1980 | Harris |
| 4,836,469 A | 6/1989 | Wagenfeld |
| 5,543,198 A | 8/1996 | Wilson |
| 5,782,082 A * | 7/1998 | Hogeboom ............. F02C 7/045 181/213 |

(Continued)

OTHER PUBLICATIONS

Tony L. Parrott, et al., "Parallel-element liner impedances for improved absorption of broadband sound in ducts," Noise Control Engineering Journal, Nov.-Dec. 1995, pp. 183-195, vol. 43(6).

(Continued)

*Primary Examiner* — Brian M O'Hara
*Assistant Examiner* — Christopher Hutchens
(74) *Attorney, Agent, or Firm* — Andrea Z. Warmbier

(57) ABSTRACT

Acoustic liners for aircraft noise reduction include one or more chambers that are configured to provide a pressure-release surface such that the engine noise generation process is inhibited and/or absorb sound by converting the sound into heat energy. The size and shape of the chambers can be selected to inhibit the noise generation process and/or absorb sound at selected frequencies.

15 Claims, 7 Drawing Sheets

(56) References Cited

U.S. PATENT DOCUMENTS

| | | | |
|---|---|---|---|
| 6,435,303 B1* | 8/2002 | Warnaka | 181/286 |
| 6,454,219 B1* | 9/2002 | Moe | B64C 3/50 |
| | | | 244/214 |
| 6,948,906 B2 | 9/2005 | Leishman et al. | |
| 7,458,542 B2 | 12/2008 | Chow et al. | |
| 7,484,930 B2 | 2/2009 | Hutcheson et al. | |
| 7,637,462 B2 | 12/2009 | Pal | |
| 7,866,939 B2 | 1/2011 | Harper et al. | |
| 7,954,757 B2 | 6/2011 | Moe et al. | |
| 7,967,108 B2 | 6/2011 | Harper | |
| 8,033,510 B2 | 10/2011 | Shmilovich et al. | |
| 8,056,850 B2 | 11/2011 | Lin et al. | |
| 8,096,513 B2 | 1/2012 | Mau et al. | |
| 2004/0197194 A1 | 10/2004 | Leishman et al. | |
| 2007/0020099 A1 | 1/2007 | Hutcheson et al. | |
| 2008/0179448 A1* | 7/2008 | Layland et al. | 244/1 N |
| 2008/0223655 A1* | 9/2008 | Peiffer et al. | 181/292 |
| 2009/0084905 A1 | 4/2009 | Mau et al. | |
| 2010/0133378 A1 | 6/2010 | Lidoine | |
| 2010/0206664 A1* | 8/2010 | Bagnall | F02C 7/045 |
| | | | 181/214 |
| 2010/0294883 A1 | 11/2010 | Trich Jr. et al. | |
| 2011/0133025 A1* | 6/2011 | Vauchel et al. | 244/1 N |
| 2012/0156006 A1* | 6/2012 | Murray et al. | 415/119 |
| 2013/0062143 A1 | 3/2013 | Ichihashi | |

OTHER PUBLICATIONS

L. S. Wirt, "Analysis, Testing, and Design of Lined Ducts," The Journal of the Acoustical Society of America, May 1972, pp. 1448-1463, vol. 51(5), Part 1.

Tony L. Parrott, et al., "Effect of Resonator Axis Skew on Normal Incidence Impedance," AIAA 2003-3307. 9th AIAA/CEAS Aeroacoustic Conference, May 12-14, 2003. pp. 1-8. Hilton Head, South Carolina.

Brian M. Howerton, et al., "Validation of an Acoustic Impedance Prediction Model for Skewed Resonators," AIAA 2009-3143. May 2009, pp. 1-21.

M. G. Jones, et al., "Assessment of Soft Vane and Metal Foam Engine Noise Reduction Concepts," AIAA 2009-3142, May 2009, pp. 1-20.

Mehdi R. Khorrami, et al., "Application of Passive Porous Treatment to Slat Trailing Edge Noise," NASA/TM-2003-212416, May 2003, pp. 1-14.

Mehdi R. Khorrami, et al., "Novel Approach for Reducing Rotor Tip-Clearance-Induced Noise in Turbofan Engines," AIAA Journal, Aug. 2002, pp. 1518-1528, vol.40, No. 8.

Meelan Choudhari, et al., "Computational Study of Porous Treatment for Altering Flap Side-Edge Flowfield," AIAA 2003-3113, 9th AIAA/CEAS Aeroacoustics Conference, May 12-14, 2003, pp. 1-15, Hilton Head, South Carolina.

W. Clifton Horne, et al., "Measurements of 26%-scale 777 Airframe Noise in the NASA Ames 40-by 80 Foot Wind Tunnel," AIAA 2005-2810, 11th AIAA/CEAS Aeroacoustics Conference (26th AIAA Aeroacoustics Conference), May 23-25, 2005, pp. 1-19, Monterey, California.

D. Angland, et al., "Measurements of Flow around a Flap Side-Edge with Porous Edge Treatment," AIAA 2006-213, 44th AIAA Aerospace Sciences Meeting and Exhibit, Jan. 9-12, 2006, pp. 1-22, Reno, Nevada.

D. Angland, et al., "Measurements of Flow around a Flap Side Edge with Porous Edge Treatment," AIAA Journal, Jul. 7, 2009, pp. 1660-1671, vol. 47, No. 7.

* cited by examiner

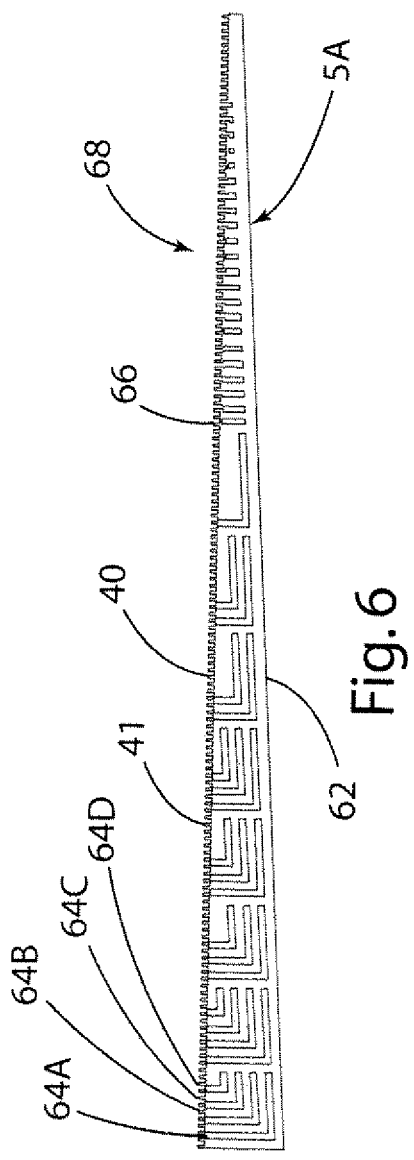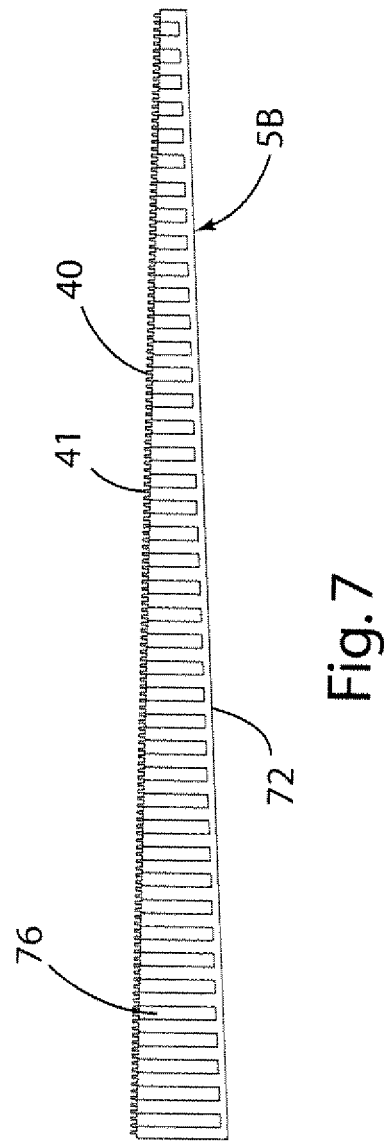

EXTERNAL ACOUSTIC LINERS FOR MULTI-FUNCTIONAL AIRCRAFT NOISE REDUCTION

CROSS REFERENCE TO RELATED APPLICATIONS

This application is related to U.S. patent application Ser. Nos. 13/417,347 and 13/417,349 filed on the same day as this application. This application claims the benefits of U.S. Provisional Application No. 61/451,727, filed on Mar. 11, 2011; 61/451,730 filed on Mar. 11, 2011; 61/451,735 filed on Mar. 11, 2011; and 61/597,282, filed on Feb. 10, 2012, the entire contents of all which are incorporated by reference.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

The present invention generally relates to reducing noise of aircraft, and in particular to the use of external acoustic liners: (1) to present a pressure-release surface in the near-field of a source to inhibit the noise production process, (2) to absorb sound incident on the liner surface by converting sound into heat, or (3) to simultaneously provide each of these noise reduction mechanisms.

BACKGROUND OF THE INVENTION

Aircraft noise is a significant issue with both economic and public health implications, for environments both internal and external to the aircraft. As a result, increasingly stringent international constraints are being placed on manufacturers to reduce this noise. Emphasis has been placed on the development of concepts to reduce this noise, whether at the source (e.g., modifications to the shape of the engine fan) or along the propagation path (e.g., installation of acoustic liners in the walls of the engine nacelle). These approaches have significantly reduced aircraft noise, but further noise reduction is needed.

Technologies used in the reduction of turbofan engine noise include, but are not limited to: (1) shield or direct noise from the engine by location and shape of the engine nacelle, (2) absorb and/or redirect noise utilizing acoustic liners mounted in the walls of an engine nacelle, (3) modify fan geometry (e.g., lean and sweep of blades, rotor and/or stator spacing) to reduce noise generated by the fans, and (4) increase bypass ratio to reduce the strength of jet noise at the source.

BRIEF SUMMARY OF THE INVENTION

One aspect of the present invention is an improvement to aircraft of the type having a fuselage defining outwardly-facing surfaces. Aircraft such as this also include lift-generating wings extending outwardly in generally opposite directions away from the fuselage, and defining outer wing surfaces. The aircraft includes at least one engine having a thrust-generating element, and the aircraft includes a source of noise that produces noise during operation of the aircraft. An improvement according to one aspect of the present invention includes a noise absorbing acoustic liner disposed on at least a portion of one of the outer surfaces of the fuselage and the wings. The noise absorbing liner includes a porous outer surface that permits a substantial portion of noise incident on the porous surface to pass therethrough. The liner further includes at least one internal chamber and may include a plurality of internal chambers that are separated by a partition. The chamber or chambers receive sound that enters through the porous outer surface. The liner may include a first chamber with internal surfaces defining a first chamber geometry. The liner may also include one or more additional chambers with internal surfaces defining chamber geometries. Each internal chamber geometry may be, but is not required to be, identical to any other chamber geometry. Each chamber may include one or more layers, and each layer may be filled with material such as foam, metallic or ceramic spheres, porous mesh or the like. The materials of the layers may be different if required to provide a specific absorption characteristic for a specific application. The internal chamber or chambers convert at least a substantial portion of the sound that enters the chamber(s) through the porous surface into heat energy. Sound that has not been converted to heat energy is transmitted out of the internal chamber(s) through the porous surface, such that a significant portion of the sound from the source of noise is absorbed by the acoustic liner.

The aircraft may include a propulsion system (e.g., open-rotor, turboprop, propfan, unducted fan, or open flux rotor jet engines) defining one or more rotor planes. The acoustic liners may be positioned on outer surfaces of the aircraft at or near the rotor planes. The acoustic liners may be located on the wing surfaces or the fuselage surfaces in the path of the sound radiated from the open-rotor engine. One or more acoustic liners may also be mounted to one or more control surfaces of the wings such as an elevon, elevator, or aileron.

An acoustic scattering prediction method is used to estimate the effectiveness (i.e., acoustic energy attenuation) of the external liner based on the acoustic impedance spectrum at the surface of the liner. Therefore, the placement of, and acoustic impedance spectrum presented by, the external liner is optimized for a given engine source using the aforementioned prediction method. This optimized surface impedance spectrum drives the selection of geometric and material parameters for the external liner.

The partitions between adjacent internal chambers of the liner may be impervious or porous. If the partitions are impervious, their separation distance determines whether the liner is local-reacting or extended-reacting. Each chamber may have a different geometry from all other chambers within the liner. An optional face sheet such as a thin perforated sheet of material, a layer of mesh material, or the like serves as an interface between the surrounding aeroacoustic environment and the internal chamber(s) of the liner. If no face sheet is included, sound enters directly into the individual internal chamber(s) of the liner, and the absorption is achieved within the body of the liner. If a face sheet is included, sound passes through the face sheet into the internal chamber(s) of the liner, and the additional acoustic resistance of the face sheet affects the sound absorption of the liner.

These and other features, advantages, and objects of the present invention will be further understood and appreciated by those skilled in the art by reference to the following specification, claims, and appended drawings.

BRIEF DESCRIPTION OF THE DRAWINGS

FIG. 6 is a partially schematic cross-sectional view of an elevon with variable length, bent acoustic chambers;

FIG. 7 is a partially schematic cross sectional view of an elevon with variable-length, straight acoustic chambers.

DETAILED DESCRIPTION

Figure 3:
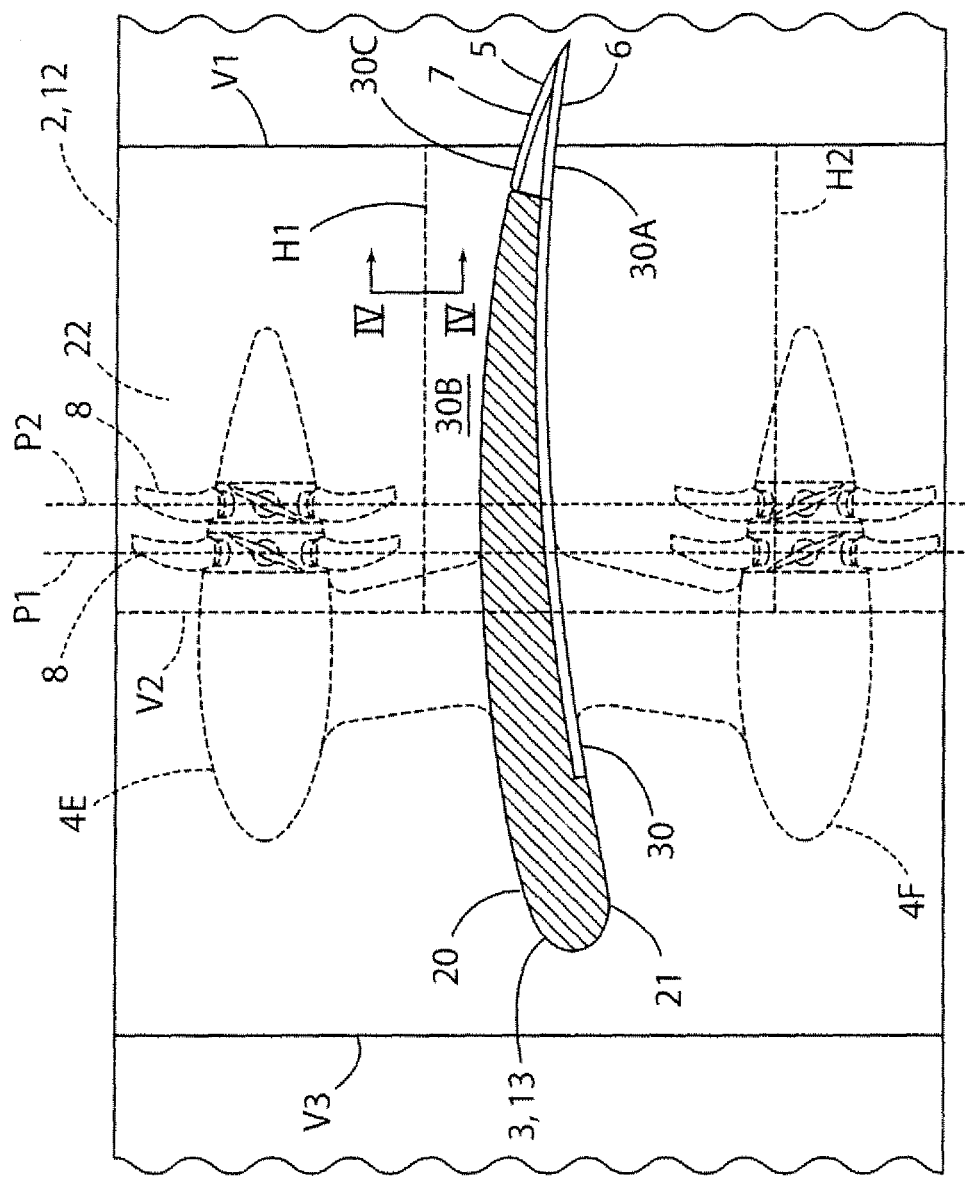
FIG. 3 is a partially fragmentary cross-sectional view of an aircraft wing and a portion of a fuselage, showing the engines mounted optionally above or below the aircraft wing.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
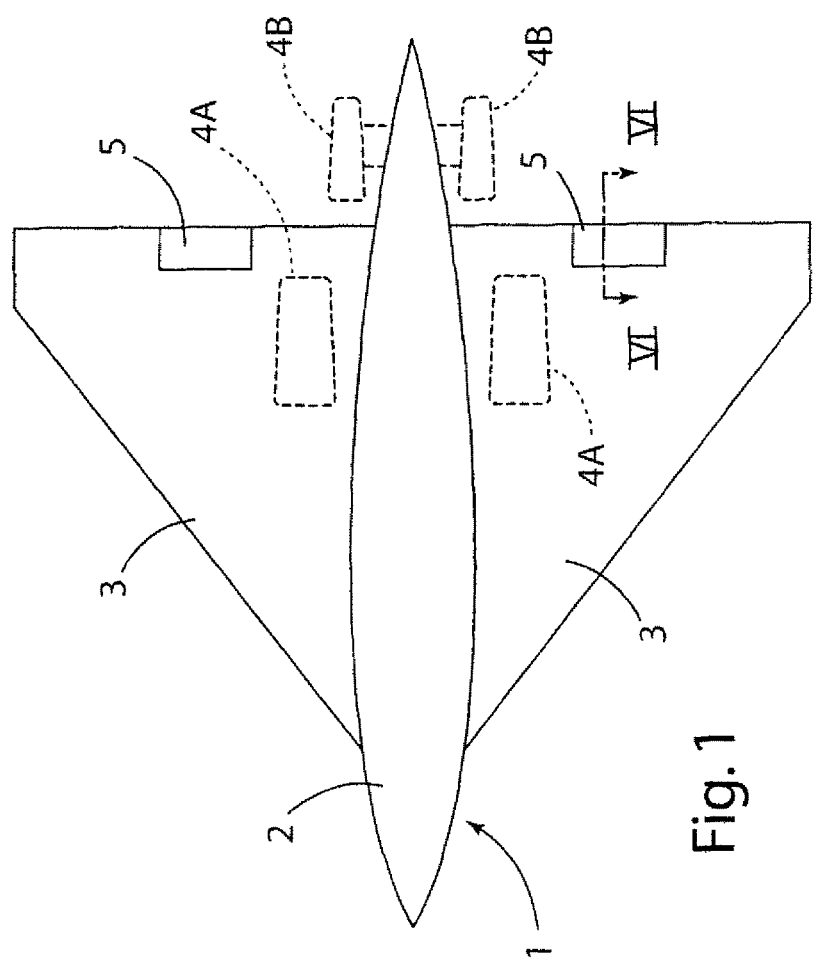
FIG. 1 is a partially schematic plan view of an aircraft according to one aspect of the present invention.

With reference to FIG. 1 an aircraft 1 of a known type generally includes a fuselage 2 and wings 3. The aircraft 1 also includes one or more control surfaces such as elevons 5. The aircraft 1 includes one or more engines 4A, 4B that provide thrust. The engines may be mounted to the wings 3 as designated "4A" in FIG. 1, or the engines may be mounted directly to the fuselage 2 as designated "4B" in FIG. 1. The engines 4A may be mounted either above or below wings 3 or fuselage 2. Also, the engines 4 may comprise turbofan engines, or open rotor engines, or other suitable source of thrust. The engines 4 may be a significant source of noise during operation of aircraft 1.

Figure 2:
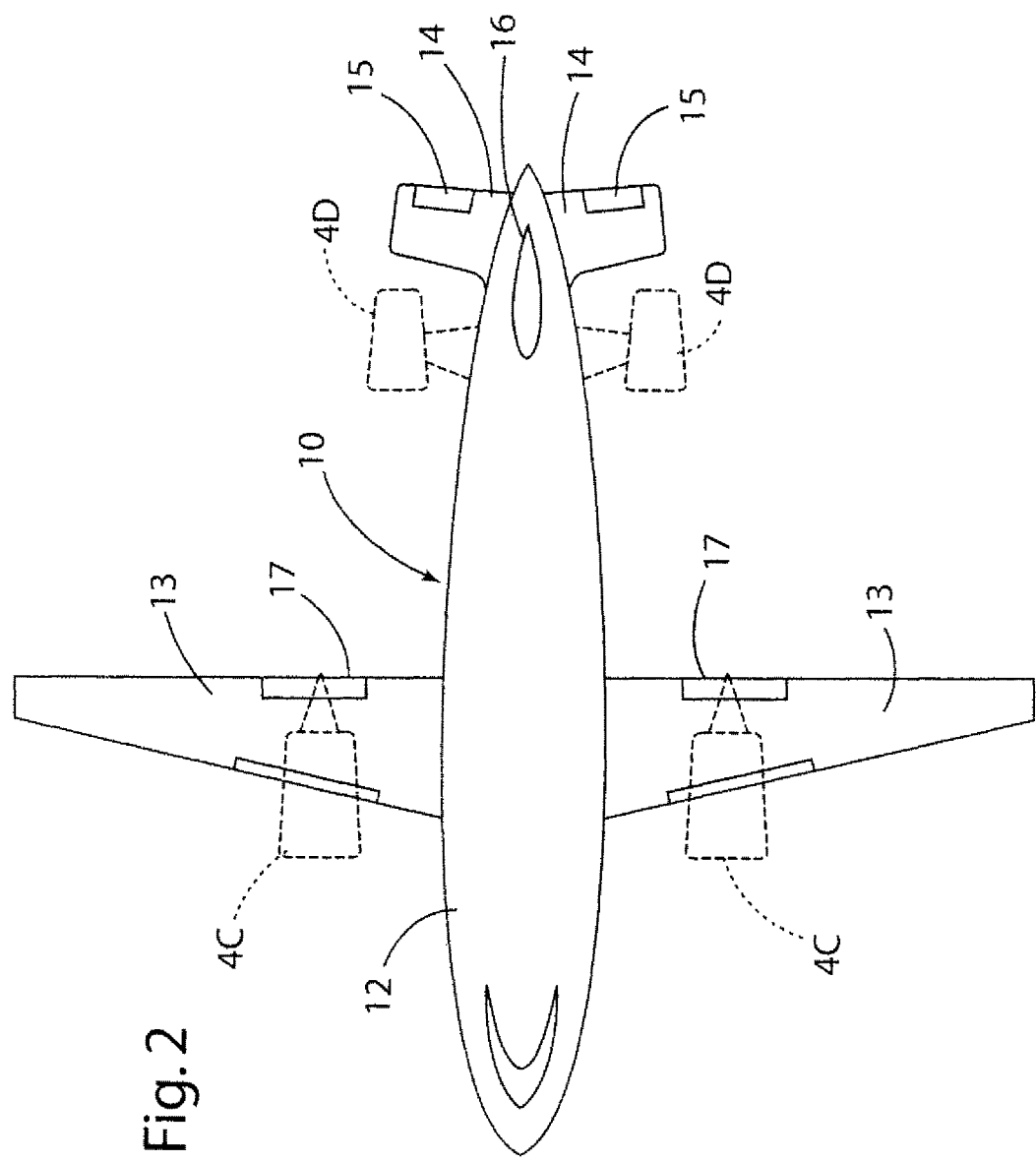
FIG. 2 is a partially schematic plan view of an aircraft according to another aspect of the present invention.

With further reference to FIG. 2, an aircraft 10 of another known type includes an elongated fuselage 12, and wings 13. The engines 4 may be mounted to the wings 13 as designated "4C" in FIG. 2, or the engines may be mounted directly to the fuselage 12 as designated "4D" in FIG. 2. In the illustrated example, the aircraft 10 includes horizontal stabilizers 14 and a vertical stabilizer 16. Elevators 15 and ailerons 17 provide for control of aircraft 10 in a known manner. With the exception of the inventive acoustic liners described in more detail below, the aircraft 1 (FIG. 1) and 10 (FIG. 2) may comprise known aircraft designs, such that the details of these aircraft will not be further described herein, except to the extent necessary to convey understanding of the inventive acoustic liners described in more detail below.

With further reference to FIG. 3, open rotor engines 4 may be mounted to an upper side 20 of wing 3 (or 13) as designated "4E", or the engines may be mounted to a lower side 21 of wings 3 as designated "4F." The fuselage 2 (or 12) defines an outer surface 22. In general, the fuselage and wing may comprise a variety of configurations, and a variety of engines 4 may be utilized. Thus, the arrangement of FIG. 3 is simply an example of one application of an acoustic liner according to one aspect of the present application.

An acoustic liner 30 according to one aspect of the present invention is positioned on lower side 21 of wing 3, and an acoustic liner 30A is positioned on lower side 6 of elevon 5. An acoustic liner 30B is positioned on the fuselage 2. The liner(s) can be on any surface of the wing (or fuselage, elevon, pylon, etc.), including the upper one. In general, the liner should be on the lower side of the wing for community noise benefit. A lower side location for the liner is also beneficial if the engine is mounted below the wing. However, for interior noise benefiereduction (passengers) the liner may be positioned above the wing to reduce the amount of noise that gets to the passengers. The liner may also be positioned above the wing if the engine is mounted above the wing.

Acoustic liner 30B may be configured to form only a portion of outer surface 22 of fuselage 2 that is bounded by upper and lower horizontal lines H1 and H2, respectively, and portions of vertical lines V1 and V2. If engines 4 include external rotors 8, the rotors 8 define vertical rotor planes P1 and P2. A relatively large amount of noise radiates outwardly along the rotor planes P1 and P2. Thus, the acoustic liner 30B may be positioned on fuselage 2 along the plane of the rotors P1 and/or P2 corresponding to the regions having the greatest noise levels at the surface 22 of fuselage 2. However, it will be understood that the acoustic liner 30B on fuselage 2 may be larger, and may extend between the lines V1 and V3, and may wrap completely around fuselage 2. The acoustic liner 30B is preferably positioned on fuselage 2 in a location or region corresponding to higher levels of noise incident on surface 22 of fuselage 2. Also, acoustic liner 30B may also be configured to absorb noise that would otherwise be transmitted into the interior of the aircraft to thereby improve the comfort of passengers in the aircraft. Thus, various criteria determine the size and location of acoustic liners 30B on aircraft fuselage 2.

The aircraft wing 3 (FIG. 3) may include an acoustic liner 30 on lower side 21 of wing 3. Also, an acoustic liner 30A may be positioned on lower side of elevon 5.

Figure 4:
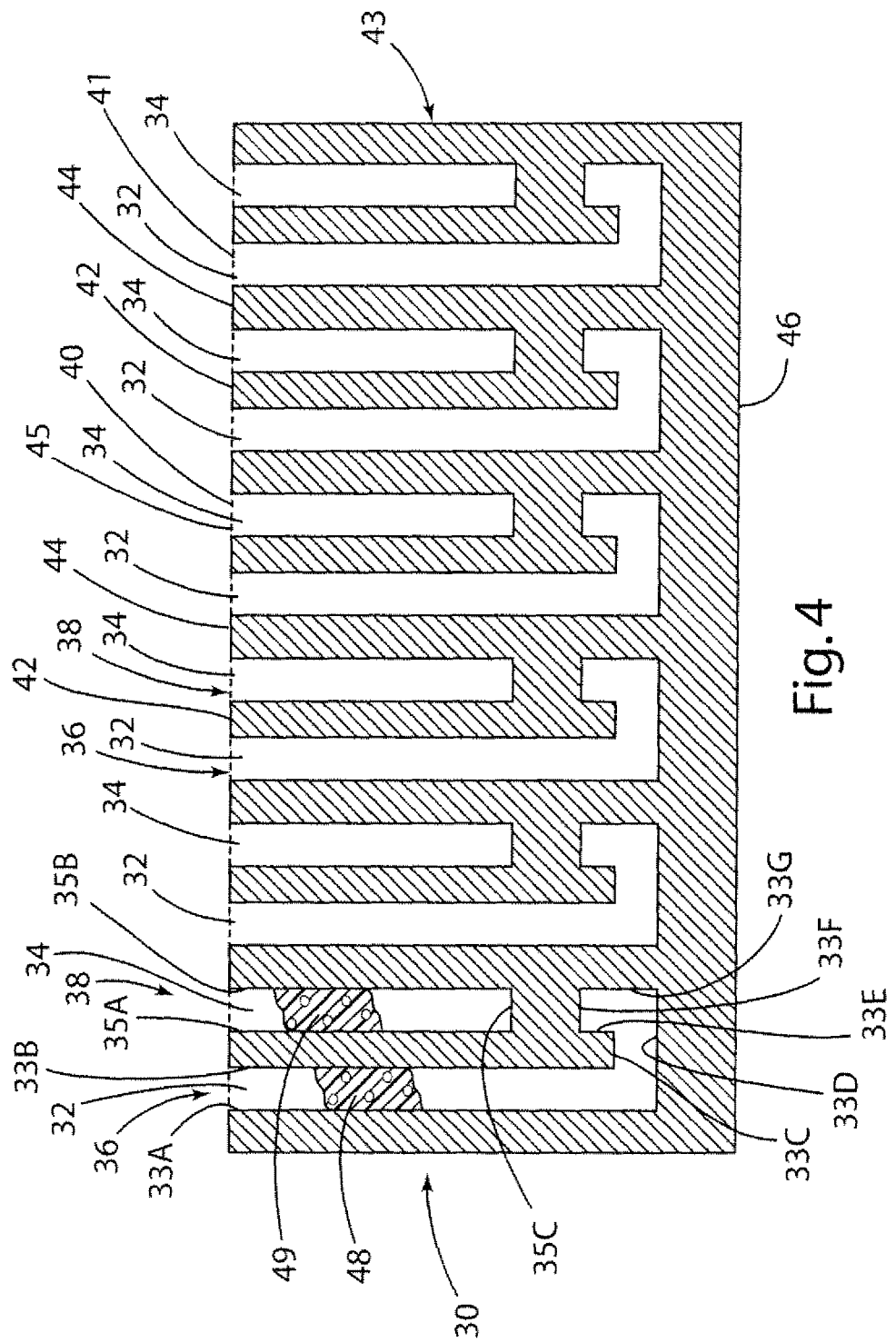
FIG. 4 is a partially fragmentary cross-sectional view of an acoustic liner.

With further reference to FIG. 4, an acoustic liner 30 according to one aspect of the present invention includes a plurality of first and second chambers 32, 34, respectively, formed in body 43. First chambers 32 have a first geometric shape defined by inner surfaces 33A-33G, and second chambers 34 including internal surfaces 35A-35C. Chambers 32 define openings 36, and second chambers 34 define openings 38. A porous surface 40 extends over the openings 36 and 38. The first and second chambers 32 and 34, respectively, are separated by partitions 42 and 44 defining the openings 36 and 38, respectively. The chambers 32 and 34 may have circular cross-sectional shapes, or the chambers may have quadrilateral or other cross-section shapes. Also, chambers 32, 34 may have linear or curved shapes, and may have cross-sectional areas that are not constant along the length of the chambers 32, 34. The porous surface 40 may comprise a separate layer of material 45 such as a sheet of perforated metal, mesh, or other material that permits sound to pass therethrough. Alternately, the porous surface 40 may comprise the openings 36 and 38 themselves, such that no additional layer of material is positioned over the openings 36 and 38.

Filler material 48 and 49 may optionally be positioned in chambers 32 and 34, respectively. The filler material 48 and 49 of chambers 32 and 34 may be identical, or it may comprise different types of material. The material 48 and 49 may comprise foam, metallic or ceramic spheres, porous mesh, or other material that provides the required acoustic characteristic for a particular application. The filler material 48 and 49 is optional, and chambers 32 and 34 may be substantially open, without filler material, as required for a particular application. The filler material 48, 49 may completely fill one or more of the chambers 32, 34, or it may partially fill one or more of the chambers 32, 34.

The acoustic liner 30 may include a base wall 46 that is integrally formed with partitions 42 and 44. Alternately, base wall 46 may comprise a separate piece of material that is bonded or otherwise secured to the material of the partitions 42 and 44. The partitions 42 and 44, and base wall 46 may be made from metal, composite materials, polymers, or other suitable material having the sound absorption/dissipation properties required for a particular application, while also providing sufficient strength and durability during use of the aircraft. The liner 30 illustrated in FIG. 4 comprises a relatively small segment of an acoustic liner. A plurality of the small segments as shown in FIG. 4 can be put side-by-side to form a liner having the required total size for a particular application.

An acoustic liner 50 (FIG. 5) according to another aspect of the present invention includes a plurality of chambers 52A-52E. The chambers 52A-52E include outer portions 54A-54E that extend generally transverse to porous surface 40 but may be skewed at an angle relative to porous surface 40. The chambers 52A-52E also include inner portions 56A-56E that extend from outer portions 54A-54E, respectively, in a direction that is generally transverse to outer portions 54A-54E but may be skewed at an angle relative to portions 54A-54E. Chambers 52A-52E are separated from one another by partitions 58A-58D. Two or more of the chambers 52A-52E may optionally be interconnected by internal passageways 47 to permit sound to travel between the passageways 52A-52E. An outer wall 59 and liner structure 60 separate chambers 52A and 52E from the surrounding acoustic environment. Chambers 52A-52E may have circular, quadrilateral, or other cross-sections shapes.

The partitions 42 and 58 may be either impervious or porous. If the partitions are impervious, their separation distance determines whether the liner is local-reacting or extended-reacting. If they are porous, the liner is extended-reacting.

The length of outer portions 54A-54E and the inner portions 56A-56E of chambers 52A-52E, respectively, are each different from one another such that each of the chambers 52A-52E provides for different sound absorption/dissipation properties to optimize absorption/dissipation at a variety of frequencies. Filler material 48 and/or 49 may be positioned in one or more of the chambers 52A-52E.

Figure 5:
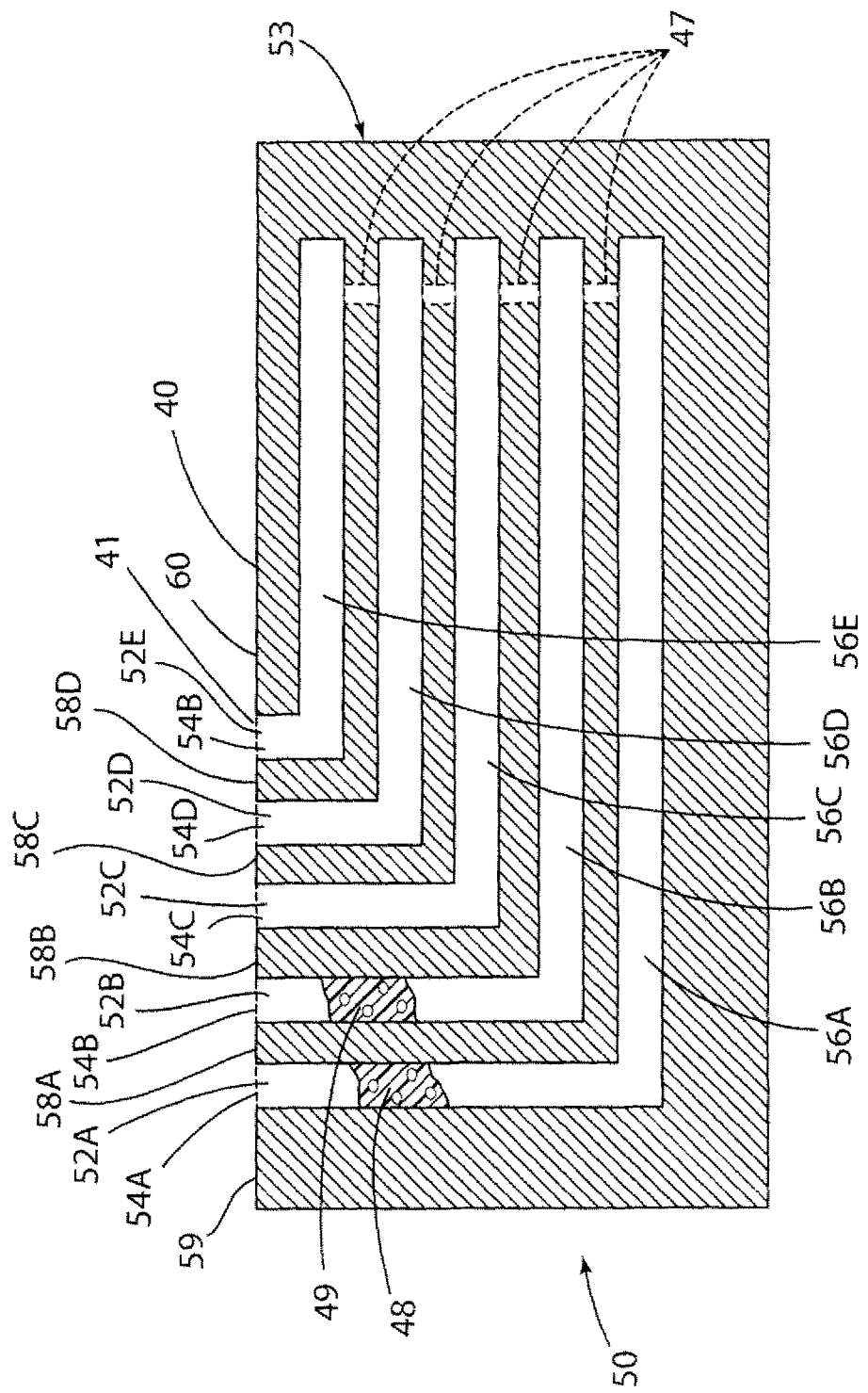
FIG. 5 is a partially fragmentary cross-sectional view of an acoustic liner.

The acoustic liners 30 and 50 of FIGS. 4 and 5 permit sound from the engines 4 or other source of noise to enter into the chambers, and a portion of that sound is absorbed. Some of the energy is converted to heat by viscous scrubbing losses along the walls 33A and 33B of the chamber, but much of the sound is absorbed by the Helmholtz resonator set up by the volume of the chamber 32. The liners 30 and 50 of FIGS. 4 and 5, respectively are designed as local-reacting liners, such that sound enters and exits at the same location, and does not communicate with adjacent chambers within the liner. If the chambers are filled with a material such as the filler materials 48 and 49, and if internal passageways 47 or porous partitions are utilized, an extended reacting liner can be achieved whereby entrance and exit locations of sound may be different, and sound travels in all directions within the liners 30 and 50. In general, the proper combination of porosity of a sheet 41 of material forming porous surface 40, chamber geometry, and choice of media (e.g., air, bulk material 48, 49) allows the liners 30 and 50 to be designed to target either narrow or broadband frequency regimes. The sound enters through porous surface 40, and the sound is converted to heat within the body of the liners 30 and 50. The remaining portion of the sound is transmitted out through the porous surface 40, and is radiated away from the surface of the aircraft.

Referring again to FIG. 3, an acoustic liner 30A may be positioned on a lower surface 6 of elevon 5, and/or a liner 30C may be positioned on an upper surface 7 of elevon 5. The elevon 5 is one example of a surface that may be utilized in connection with the acoustic liners of the present invention. However, the acoustic liners may be utilized at virtually any exterior surface of an aircraft, provided that the acoustic liner does not significantly interfere with the aerodynamic characteristics of the region in which the liner is to be utilized.

With further reference to FIG. 6, an elevon 5A according to one aspect of the present invention includes a body 62, and a plurality of acoustic chambers 64A-64D that are generally L-shaped. Each of the chambers 64A-64D has a different length to thereby absorb sound of different frequencies according to the requirements of a particular application. The body 62 of elevon 5A also includes a plurality of chambers 66 formed in a upper rear portion 68 of elevon 5A. Each of the chambers 66 has a slightly different length to thereby absorb sound of different frequencies. The elevon 5A optionally includes a perforated sheet 41 forming a porous surface 40. Alternately, the chambers 64A-64D and 66 may be open (i.e., without a perforated sheet 41) to thereby define porous surface 40. Two or more of the chambers 64A-64D may optionally be interconnected by internal passageways (not shown).

With further reference to FIG. 7, an elevon 5B according to another aspect of the present invention includes a body 72 having a plurality of chambers 76 formed therein, and a porous surface 40 that may optionally be formed by a perforated sheet 41. Each of the chambers 76 has a somewhat different length due to the tapered overall configuration of elevon 5B such that each chamber 76 is optimized to absorb sound of a specific frequency. Two or more of the chambers 76 may optionally be interconnected by internal passageways (not shown).

Figure 8:
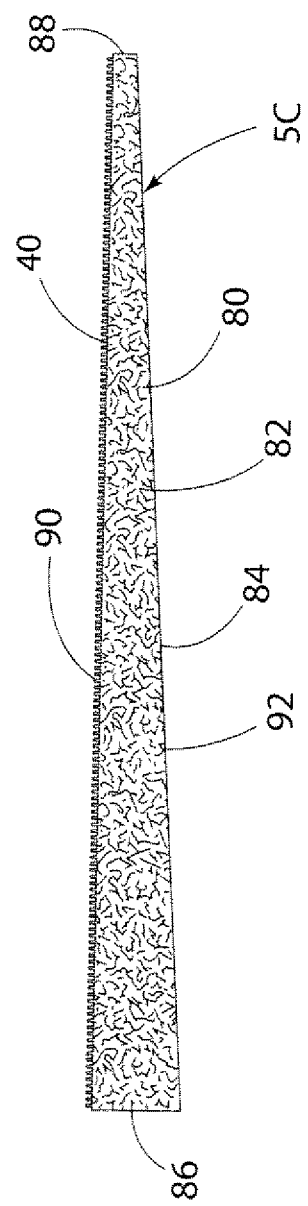
FIG. 8 is a cross-sectional view of an elevon according to another aspect of the present invention.

With further reference to FIG. 8, an elevon 5C according to another aspect of the present invention includes an internal space 80 that is partially or completely filled with filler material 82. The filler material 82 may comprise a metallic foam or other suitable material. Elevon 5C includes a porous upper surface 40 that may comprise a perforated sheet of metal or other suitable material. The lower surface 84, front/leading surface 86, and/or trailing surface 88 may comprise thin sheets of metal or other suitable material. It will be understood that porous surface 40 may extend over the entire upper and lower sides 90 and 92, respectively, or a portion of one or both sides 90 and 92.

It will be understood that the acoustic liners described in connection with FIGS. 4-8 are examples of acoustic liners according to some aspects of the present invention. However, the final size and configuration of the chambers, the configuration of the perforated sheet 41, the filler material, and the like are chosen to provide optimum sound absorption at specified frequencies for a particular application. Also, it will be understood that FIGS. 4-7 represent cross-sectional views, and the chambers may be closed off at opposite ends by end walls or the like. Also, the elevon or other structure may include porous surfaces on both the upper and lower sides, and one or more passageways may be open at opposite ends such that sound enters one side of the elevon and exits the other side at a reduced volume.

A scattering prediction method is used to estimate the amount of sound that will radiate from the surface based on the acoustic impedance spectrum at the surface of the liner and is thereby used to guide the selection of the final liner design.

As discussed above, porous surface 40 may comprise a sheet of material 41. The material 41 may comprise a thin layer of perforated metal (e.g. aluminum), mesh, or the like. Because the surface 40 is porous, it has the potential for increasing skin friction and drag. Thus, the acoustic liners 30, 50 must be placed at strategic locations. The aforementioned acoustic scattering prediction method may be used to identify these locations, as well as the associated surface acoustic impedance spectrum to achieve optimum attenuation of the radiated acoustic energy. This computational ability, in combination with external acoustic liners designed to match the optimum impedance spectra for given engine source, provides a unique capability.

The locations of the liners may be chosen to be in the near field of a noise source such as an open rotor engine to thereby modify the sound field before it radiates away from the source of the location. Other locations for the liner are chosen to attenuate the radiated sound and inhibit the defraction of sound around the edge of a surface.

One way to reduce the skin friction drag caused by external acoustic liners according to the present invention is to introduce mean flow through the porous surface 40 of the liner. This flow, typically referred to as bias flow, offers multi-functional enhancement. Proper choice of the flow rate can be used to reduce the skin friction drag at the liner surface 40. If the liner face sheet 41 is properly designed, this bias flow can also be used to optimize the specific acoustic impedance at the liner surface 40, such that sound absorption is maximized.

Another benefit of the acoustic liners of the present invention is the reduction of radiated noise to the interior of the aircraft (passengers and crew). The same locations for the acoustic liners that reduce noise propagation to the ground can also reduce noise transmission to the aircraft interior. This aspect of the acoustic liners of the present invention is particularly advantageous if the engine 4 comprises an open rotor engine whereby the propulsion noise propagates directly to the fuselage without a nacelle to attenuate noise.

Accordingly, the acoustic liners of the present invention reduce noise to the community surrounding the airport or other facility, reduce noise to the interior of the aircraft, and with the addition of bias flow can also reduce aircraft drag. Relatively small acoustic liners according to the present invention are capable of at least some sound attenuation over a wide frequency range.

Computer software can be utilized to design acoustic liners with multiple chambers, each of which can be designed with unique geometries to absorb a targeted frequency range. The software consists of a 2-D drawing code coupled with an acoustic impedance model to allow the user to read in the geometry for the liner shape, draw in the liner chambers then compute the resulting acoustic impedance. Modifications to the chamber geometries can be made graphically and the effects on impedance calculated in real-time providing instant feedback on those changes. This graphical approach creates an efficient design process where the spatial relationships between the liner chambers and the overall packaging of those chambers in the liner can be visualized. The acoustic liner design software can be utilized to design liners conforming to the optimized acoustic impedance spectrum obtained from acoustic scattering predictions. This optimization may include the effects of the liner on the sound radiated external to the aircraft, as well as the sound transmitted into the interior of the aircraft.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. An aircraft comprising:
a fuselage defining outwardly-facing surfaces and lift-generating wings extending outwardly in generally opposite directions away from the fuselage and defining outer wing surfaces;
at least one engine having a thrust-generating element, and wherein the aircraft includes a source of noise that produces noise during operation of the aircraft;
a noise absorbing acoustic liner disposed on the outer surfaces of the fuselage and the wings, and having a depth dimension, the noise absorbing liner including:
a porous outer surface that permits a portion of noise incident on the porous surface to pass therethrough, wherein the depth dimension extends between the porous outer surface and the portion of the outer surfaces of the fuselage or wings on which the acoustic liner is disposed; and
a plurality of internal chambers of different lengths interconnected by internal passageways to permit sound to travel between the internal chambers,
wherein each of the plurality of internal chamber has an opening; connected to the porous outer surface,
wherein each of the plurality of internal chambers, receives sound through the porous outer surface, and has a first internal surfaces defining the internal chamber,
wherein each of the plurality of internal chambers includes a first portion that extends into the depth dimension of the acoustic liner away from the porous outer surface to a depth that is greater than the dimension of the opening,
wherein each of the plurality of internal chambers converts a first portion of the sound that enters the internal chambers through the porous outer surface into heat energy, and transmits sound that has not been converted into the heat energy out of the internal chambers through the porous surface, and
wherein each of the plurality of internal chambers contains an acoustic filler material that absorbs a second portion of the sound that enters the internal chamber.

2. The aircraft of claim 1, wherein:
the internal chambers comprise first and second chambers each having respective first and second opposite ends and respective first and second openings, and wherein at least one of the first and second opposite ends of the first and second chambers is connected to the porous surface through the respective first and second openings.

3. The aircraft of claim 2, wherein:
the porous surface includes first and second portions that are directly adjacent one another, and wherein the opening of the first chamber is connected to the first portion of the porous surface, and wherein the opening of the second chamber is connected to the second portion of the porous surface.

4. The aircraft of claim 3, wherein the internal chambers are each separated by a respective partition such that sound is not transmitted from the first chamber to the second chamber through the partition other than through the internal passageways, and such that sound is not transmitted from the second chamber to the first chamber through the partition other than through the internal passageways.

5. The aircraft of claim 4, wherein:
sound exits the first and second chambers through the respective openings of the first and second chambers at the porous surface.

6. The aircraft of claim 1, wherein:
the internal chambers of the liner includes first and second chambers, a substantial portion of the first chamber is filled with a first acoustic filler material having a first composition, and a substantial portion of the second chamber is filled with a second acoustic filler material having a second composition that is significantly different than the first composition.

7. The aircraft of claim 1, wherein:
the porous surface comprises a sheet of material defining a plurality of openings therethrough.

8. The aircraft of claim 1, wherein:
the internal chambers of the liner include first and second chambers that are separated by a partition such that sound is not transmitted from the first chamber to the second chamber through the partition other than through the internal passageways, and such that sound is not transmitted from the second chamber to the first chamber through the partition other than through the internal passageways.

9. The aircraft of claim 1, wherein:
the internal chambers have a quadrilateral shape in cross section, a length dimension extending into the depth dimension of the acoustic liner, and a width dimension extending transverse to the length dimension, wherein the length dimension is greater than the width dimension.

10. The aircraft of claim 1, wherein:
the porous surface is approximately planar; and wherein: each of the internal chambers defines an outer portion that extends into the depth dimension of the acoustic liner and transverse relative to the porous surface, and an inner portion that extends generally parallel to the porous surface.

11. A method of reducing noise in an aircraft having an outer surface that does not form part of an engine nacelle, the method comprising:
determining a region on the outer surface that is exposed to a significant amount of noise generated by the aircraft in operation;
determining a spectral profile of the noise that is incident on the region of the outer surface during operation of the aircraft;
providing at least a portion of the outer surface with an acoustic liner having a depth dimension, a porous surface, and a plurality of internal chambers of different lengths interconnected by internal passageways to permit sound to travel between the internal chambers, and acoustically connected to the porous surface such that sound travels through the porous surface into the internal chamber, wherein the depth dimension of the acoustic liner extends between the porous surface and the outer surface;
determining frequencies at which peak noise levels occur;
determining a placement and surface acoustic impedance spectrum of the acoustic liner through the use of acoustic scattering prediction methods; and
configuring the plurality of internal chambers to absorb sound in frequency ranges corresponding to a frequency of at least one peak of the spectral profile, wherein the plurality of internal chambers includes a first portion that extends into the depth dimension of the acoustic liner away from the porous surface toward the outer surface and to a distance that is greater than the dimension of the opening, and wherein the plurality of internal chambers contain an acoustic filler material that absorbs a portion of the sound that enters the plurality of internal chambers.

12. The aircraft of claim 11, wherein:
a first chamber, from the plurality of chambers, includes a first portion and an inner portion, the inner portion extending transversely from the first portion, whereby the first and inner portions of the first chamber together form an L-shape in a side cross-section of the acoustic liner.

13. The aircraft of claim 12, wherein:
the first chamber includes a third portion extending transversely from the inner portion, whereby the first, inner, and third portions of the first chamber together form a J-shape in a side cross-section of the acoustic liner, and wherein at least a portion of a second chamber, from the plurality of chambers, is disposed between the inner portion of the first chamber and the porous surface.

14. An aircraft comprising:
a fuselage defining outwardly-facing surfaces and lift-generating wings extending outwardly in generally opposite directions away from the fuselage and defining outer wing surfaces;
at least one engine having a thrust-generating element, and wherein the aircraft includes a source of noise that produces noise during operation of the aircraft; and
a noise absorbing acoustic liner disposed on at least a portion of one of the outer surfaces of the fuselage and the wings, the noise absorbing liner including:
a porous outer surface that permits a portion of noise incident on the porous surface to pass therethrough;
a first and a second chamber connected to the porous outer surface and extending into a depth dimension of the acoustic liner away from the porous outer surface and toward the outer surfaces of the fuselage or wings;
a partition connected to the porous outer surface and disposed between first and second internal chambers, wherein the partition is substantially impervious such that sound is not transmitted from the first internal chamber to the second internal chamber, and such that sound is not transmitted from the second internal chamber to the first internal chamber;
wherein the first and second chambers contains an acoustic filler material that absorbs a first portion of the sound that enters the first and second chambers through the porous surface,
wherein the first and second chambers convert at least a portion of the sound enters the first and second chambers through the porous surface into beat energy, and transmits sound that has not been converted to heat energy out of the first and second internal chambers through the porous surface whereby a portion of the sound from the source of noise is absorbed by the acoustic liner.

15. The aircraft of claim 14, wherein each of the first and second chambers comprise a first end connected to the porous outer surface, and each of the first and second chambers comprise a second end terminating and embedded within the partition.

\* \* \* \* \*